(12) United States Patent
Yugo et al.

(10) Patent No.: US 7,011,176 B2
(45) Date of Patent: Mar. 14, 2006

(54) POWER DEVICE FOR AN AUTOMOTIVE VEHICLE

(75) Inventors: Masaki Yugo, Kakogawa (JP);
Yoshiaki Takahashi, Nishiwaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 329 days.

(21) Appl. No.: 10/442,924

(22) Filed: May 22, 2003

(65) Prior Publication Data

US 2005/0045405 A1 Mar. 3, 2005

(30) Foreign Application Priority Data

May 31, 2002 (JP) .............................. 2002/160824

(51) Int. Cl.
*B60K 28/10* (2006.01)
(52) U.S. Cl. ...................... 180/277; 180/274; 180/279; 180/283
(58) Field of Classification Search ................ 180/274, 180/277, 279, 282, 283
See application file for complete search history.

(56) References Cited

U.S. PATENT DOCUMENTS 5,389,824 A 2/1995 Moroto et al.
6,127,741 A 10/2000 Matsuda et al.

FOREIGN PATENT DOCUMENTS

DE 199 37 491 2/2001
JP 6-46502 2/1994

*Primary Examiner*—Eric Culbreth
(74) *Attorney, Agent, or Firm*—Wenderoth, Lind & Ponack, L.L.P.

(57) ABSTRACT

A power device for an automotive vehicle includes an interlock switch 1, a crash sensor 2 for detecting an impact of an automotive vehicle, an interlock relay 3 controlled and turned ON and OFF by the interlock switch 1, and a contactor 4 for interrupting an output circuit 11 when the interlock relay 3 is turned OFF. In the power device, when the interrupting signal is outputted from the crash sensor 2, or when the interlock switch 1 is turned OFF from ON, the contactors 4 are turned OFF to interrupt the output circuit 11. Further, the power device has a switching element 6 connected to exciting coils 4a of the contactors 4 in series and is turned ON and OFF by an interrupting signal from the crash sensor 2. When the crash sensor 2 outputs the interrupting signal, the contactors 4 are turned OFF by the switching elements 6.

13 Claims, 4 Drawing Sheets

POWER DEVICE FOR AN AUTOMOTIVE VEHICLE

This application is based on Applications No. 2002-160824 filed in Japan on May 31, 2002, the content of which is incorporated hereinto by reference.

BACKGROUND OF THE INVENTION

The present invention relate to a power device for an automotive vehicle, especially to a power device for an automotive vehicle interrupting an output circuit by a crash sensor and an interlock switch.

In a conventional power device for an automotive vehicle shown in FIG. 1, a crash sensor 22 and an interlock switch 21 turn an interlock relay 23 OFF from ON. When turned OFF from ON, the interlock relay 23 turns contactor 24, which is connected to an output circuit of a power source, to OFF from ON. The crash sensor 22 detects the impact when an automotive vehicle crashes, and turns the interlock relay 23 to OFF from ON. The output circuit of a power source is interrupted by detecting the impact of an automotive vehicle to improve safety at a crash. Since the power device for an automotive vehicle has many secondary batteries connected in series in order to output high power by a high voltage, an extremely high current flows if shorting of the output circuit of the power supply occurs at a crash. A large amount of current generates a large amount of Joule heat in a short time. Therefore, it is important to quickly interrupt a large amount of current at a crash for safety of an automotive vehicle.

Further, the interlock switch 21 is provided in the power device of FIG. 1. When a power device is repaired for example, the interlock switch 21 interrupts the output circuit to improve safety. In the power device, the output voltage is an extremely high direct voltage, and the interlock switch 21 interrupts the output circuit to prevent an electric shock during maintenance work, or the like. Accordingly, the interlock switch 21 is turned OFF from ON when manually operated for a repair of the power device, or when it is detected that a case is opened, for example. In the power device with the interlock switch 21, the output circuit is interrupted, so that it is possible to conduct work safely.

Furthermore, a delay circuit 27 is provided in such a conventional power device in order to prevent a malfunction of the interlock relay 23. The delay circuit 27 is provided between the interlock switch 21 and the interlock relay 23 so as not to turn the interlock relay 23 to OFF from ON by a momentary interrupting signal outputted from the interlock switch 21. The interlock switch 21 can momentarily output an interrupting signal, when chattering occurs caused by vibrations of an automotive vehicle etc. If the interlock relay 23 is turned to OFF from ON in this state, the contactor 24 is turned OFF even it is unnecessary to turn it OFF. If the contactor 24 is turned OFF, the output circuit of a power device is interrupted, so that an automotive vehicle cannot run normally. It is important to prevent the interlock relay 23 from being turned OFF from ON for a safety run, when it is unnecessary. To achieve this, the delay circuit 27 is provided.

However, the power device shown in FIG. 1 has the disadvantage that a contactor cannot be quickly turned to OFF from ON, when a crash sensor detects an impact. The reason is that a crash sensor turns the interlock relay OFF via a delay circuit, and the turned-OFF interlock relay turns the contactor OFF from ON. In order to prevent a malfunction of an interlock relay, the interrupting signal outputted from an interlock switch is delayed by a delay circuit, and then an interlock relay is turned OFF; however, when a crash sensor detects impact, it is necessary to interrupt an output circuit of a power device as soon as possible. Nevertheless, in the power device of FIG. 1, the time from detecting impact by a crash sensor to turning the conductor OFF is not only operation time (T1) of the conductor, but a longer time due to the addition of delay time (T2) of the delay circuit and operation time (T3) of the interlock relay, as shown in FIG. 2. Accordingly, it takes time similar to the time interrupting the output circuit by the interlock switch. For this reason, when the crash sensor detects impact, the output circuit cannot be quickly interrupted.

The present invention has been developed to solve the above problems. It is an important object of the present invention to provide a power device for an automotive vehicle, which can quickly interrupt an output circuit corresponding to an interrupting signal of a crash sensor and can slowly interrupt corresponding to an interrupting signal of an interlock switch, capable of interrupting an output circuit in ideal time corresponding to both of a crash sensor and an interlock switch.

The above and further objects and features of the invention will more fully be apparent from the following detailed description with accompanying drawings.

SUMMARY OF THE INVENTION

A power device for an automotive vehicle according to the present invention comprises an interlock switch; a crash sensor for detecting impact of an automotive vehicle; an interlock relay controlled and turned ON and OFF by the interlock switch; and a contactor for interrupting an output circuit when the interlock relay is turned OFF. In the power device, when the interrupting signal for interrupting the output circuit is outputted from the crash sensor, or when the interlock switch is turned OFF from ON, the contactor is turned OFF to interrupt the output circuit. Further, the power device includes a switching element connected to an exciting coil of the contactor in series and turned ON and OFF by an interrupting signal of the crash sensor. When the crash sensor outputs the interrupting signal, the switching element is turned OFF, and the contactor is turned OFF by interrupting a current of the exciting coil in the contactor.

The power device for an automotive vehicle of the above construction has the feature that the power device can quickly interrupt the output circuit in correspondence with the interrupting signal of the crash sensor and can slowly interrupt in correspondence with the interrupting signal of the interlock switch. The power device is capable of interrupting the output circuit in ideal time corresponding to both of the crash sensor and the interlock switch. The reason will now be described. When the crash sensor outputs the interrupting signal, the contactor is quickly turned OFF by turning the switching element, which is connected to the exciting coil of the contactor, OFF from ON. While, when the interlock switch outputs the interrupting signal, the contactor is turned OFF not via the switching element, which operates quickly, but via the interlock relay.

The switching element connected to the exciting coil of the contactor in series can be an FET or a transistor. An exciting coil of the interlock relay, which is connected to the interlock switch via a delay circuit, can turn the interlock relay to OFF from ON after a predetermined time determined by the delay circuit when the interlock switch is turned OFF.

A positive side contactor for interrupting a positive output of the output circuit and a negative side contactor for interrupting a negative output of the output circuit can be provided as the contactor. In the power device, each of exciting coils of the positive side contactor and the negative side contactor is connected to the contact of the interlock relay, and is connected to the switching element controlled and turned ON and OFF by the crash sensor. In the power device, when the crash sensor outputs the interrupting signal, both of the switching elements are turned OFF and the positive side contactor and the negative side contactor are turned OFF from ON.

The delay circuit can include an FET, whose gate is connected to the interlock switch, connected to the exciting coil of the interlock relay, and a delay capacitor connected therein. In the delay circuit, when the interlock switch is turned OFF and the gate voltage of the FET starts to drop, the delay capacitor can delay the drop in the gate voltage so as to delay turning the FET OFF from ON.

The crash sensor can include a switch, which is turned OFF from ON when detecting impact. The exciting coil of the interlock relay can be connected to a power supply circuit via the crash sensor.

DETAILED DESCRIPTION OF THE PREFFERED EMBODIMENTS

Figure 1:
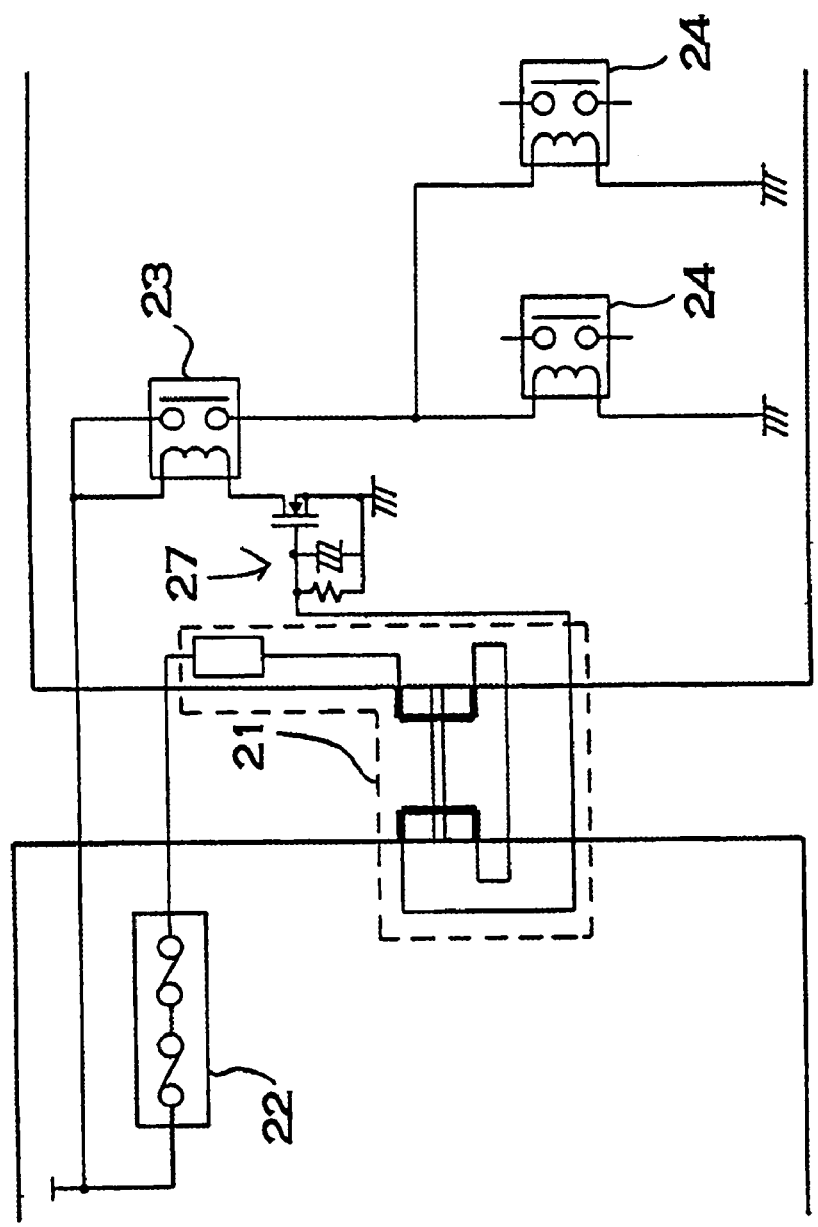
FIG. 1 is a block diagram showing a conventional power device for an automotive vehicle.
Figure 2:
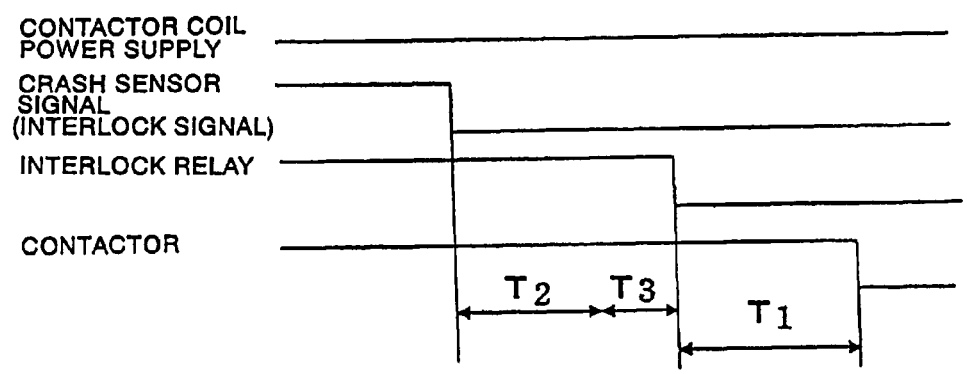
FIG. 2 is a timing chart showing that a crash sensor of the power device shown in FIG. 1 switches the contactor.
Figure 3:
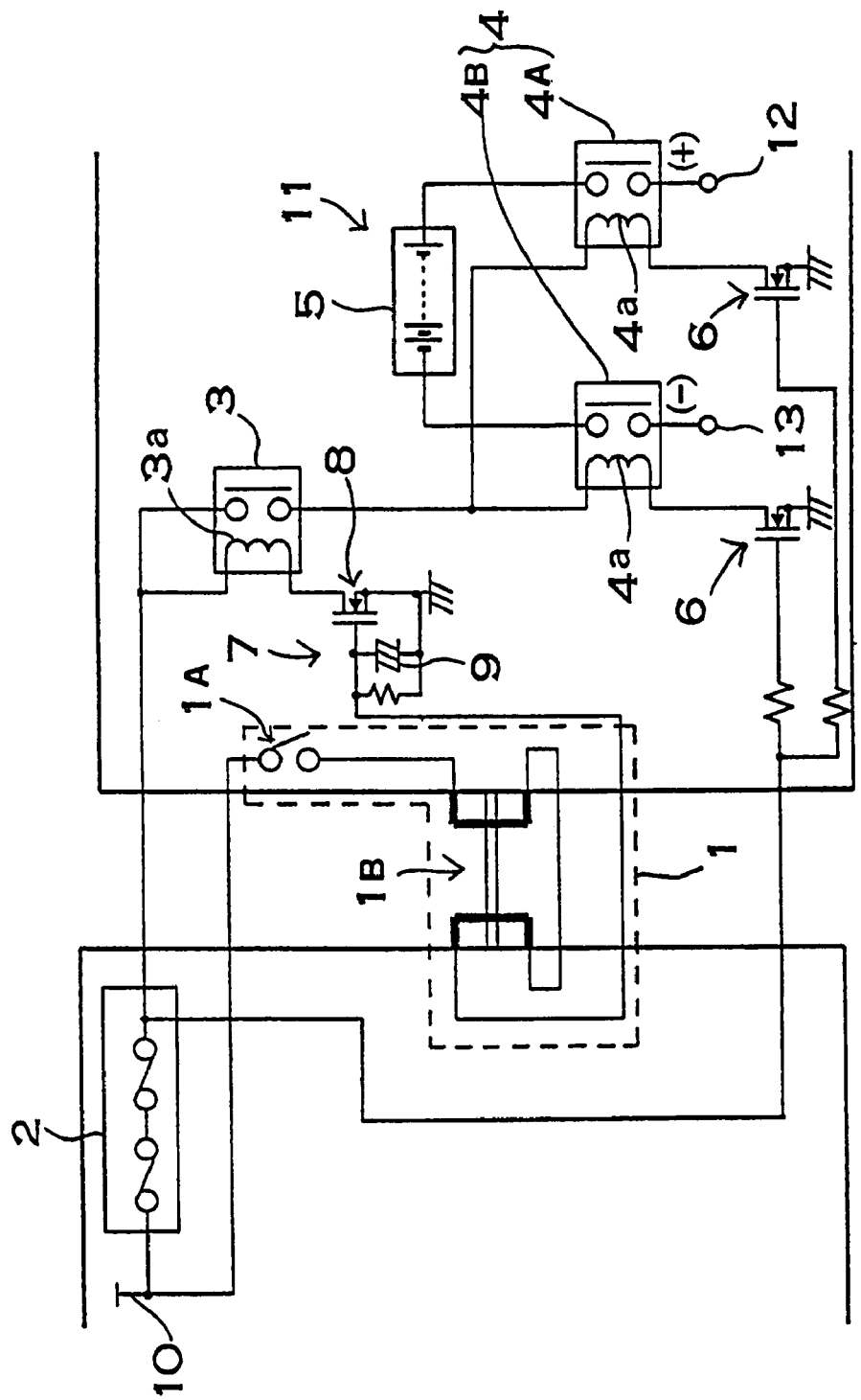
FIG. 3 is a block diagram showing a power device for an automotive vehicle of one embodiment according to the present invention.

A power device for an automotive vehicle shown in FIG. 3 is composed of an interlock switch 1; a crash sensor 2 for detecting impact of an automotive vehicle; an interlock relay 3 controlled and turned ON and OFF by the interlock switch 1; and contactors 4 turning OFF when the interlock relay 3 is turned OFF. In each contactor 4, an exciting coil 4a is connected to the contact of the interlock relay 3. When the interlock relay 3 is turned OFF, a current is not applied to the exciting coil 4a, and the contactor 4 is turned OFF. In each contactor 4, its contact is connected to the output side of a battery 5, and it interrupts an output circuit 11 of a battery 5 in the OFF state.

In addition, in the power device of FIG. 3, each of switching elements 6, which are turned ON and OFF by a signal of the crash sensor 2, is connected to each of the exciting coils 4a of the contactor 4 in series. The switching element 6 is turned OFF from ON and interrupts a current for the exciting coil 4a of the contactor 4 to turn the contactor 4 OFF, when the crash sensor 2 outputs an interrupting signal. In this state, when the contactor 4 is turned OFF, the output circuit 11 of the battery 5 is interrupted very quickly.

The interlock switch 1 keeps the output circuit 11ON in a normal use state of the power device. On the other hand, the interlock switch 1 turns the output circuit 11 OFF when it is necessary to interrupt the output circuit 11 in order to conduct work safely, for example, during maintenance of the power device, or when a case of the power device is opened, or when the power device is removed from an automotive vehicle. The power device of FIG. 3 has a first switch 1A, which is turned OFF from ON when manually switched OFF from ON or when it is detected that a part of case of the power device is opened, and a second switch 1B, which is turned OFF from ON when it is detected that the power device is removed from an automotive vehicle or that the power device is disconnected from a power circuit of an automotive vehicle. However, the present invention is not limited to the interlock switch 1 shown in FIG. 3. The interlock switch can be composed of only the first switch 1A or only the second switch 1B. Furthermore, any switch for interrupting the output circuit 11 to conduct work safely can be used, although the detailed construction is not shown in drawings.

The interlock switch 1 of FIG. 3 is a normally ON switch. The interlock switch 1 with a plurality of normally ON switches connects the switches in series. The reason is that the interlock switch 1 is turned OFF when any of the switches is turned OFF. This interlock switch 1 can control a switching element 8 of a delay circuit 7 with a simple circuit construction. The reason is that the input side of the switching element 8 is connected to a power supply circuit 10 via the interlock switch 1 so that the ON/OFF control of the interlock relay 3 can be performed via an FET or a transistor of the delay circuit 7. That is, in the ON state of the interlock relay 3, the switching element 8 is turned ON by applying a bias voltage, for turning ON, to the base of the FET or the transistor, and the switching element 8 in the ON state keeps the interlock relay 30N. When the interlock switch 1 is turned OFF, the switching element 8 is turned OFF and turns the interlock relay 3 OFF.

Additionally, a normally OFF switch can also be used as the interlock switch. This interlock switch performs ON/OFF control of the FET or the transistor of the delay circuit 7 via an inverting circuit. In the interlock switch with a normally OFF switch, all switches are connected in parallel, and the interlock switch detects that any of the switches is turned OFF.

The crash sensor 2 detects a crash of an automotive vehicle etc., and can be an inertia sensor detecting an inertia force, an impact sensor, and a G sensor. In addition, a sensor detecting that an automotive vehicle becomes deformed can be also used as the crash sensor 2. The crash sensor 2 is a normally ON switch. The crash sensor 2 is turned OFF from ON and outputs the interrupting signal in case of an emergency in which an impact or the like is detected. As shown in FIG. 3, the crash sensor 2 directly turns the interlock relay 30N and OFF. Accordingly, its circuit construction can be simple. Additionally, the crash sensor is not restricted to a normally ON switch. A normally OFF switch can also be used as the crash sensor. A normally OFF switch controls the switching element connected to the interlock relay and the exciting coil of the contactor via an inverting circuit inverting ON/OFF. Moreover, the crash sensor is not restricted to a type outputting an ON/OFF signal. A sensor outputting a pulse signal as the interrupting signal in case of an emergency in which an impact or the like is detected can be used as the crash sensor.

The crash sensor 2 of FIG. 3 is a normally ON switch. The crash sensor 2 controls ON/OFF of the interlock relay 3, and controls ON/OFF of the switching elements 6 connected to the exciting coils 4a of the contactors 4. As shown in FIG. 3, the crash sensor 2, which is turned OFF from ON in case of an emergency, is connected between the power supply circuit 10 and the exciting coil 3a of the interlock relay 3, and can control ON/OFF of the interlock relay 3. In addition, the output side of the crash sensor 2 is connected to the gate or the base, which is the input side of the switching element 6. The crash sensor 2 can turn the switching element 6 OFF from ON in case of an emergency.

The crash sensor, which outputs a pulse signal as the interrupting signal, includes a latching circuit, which switches output to "Low" from "High" based on the pulse signal as the interrupting signal. The latching circuit normally outputs "High" to keep the switching elements connected to the interlock relay and the exciting coils ON so that a direct current can be discharged in a normal state. In this state, when a pulse signal as the interrupting signal is outputted from the crash sensor, the latching circuit switches its output to "Low" from "High" and retains "Low". The "Low" signal turns the interlock relay OFF and keeps it OFF. While, the "Low" signal switches the input sides of the switching elements connected to the exciting coils of the contactors to "Low" from "High", and turns them OFF from ON, and keeps them OFF. Therefore, the exciting coils of the contactors are kept in the state that a current is not applied. The contactors keep the OFF state and interrupt the output circuit 11 of the battery.

The crash sensor 2 is shown in FIG. 3. Crash sensors may be positioned at the front and the rear of an automotive vehicle. Alternatively, the crash sensor 2 is positioned at the front or the rear of the vehicle. If a plurality of crash sensors 2 is provided in an automotive vehicle, the interlock relay 3 and the contactors 4 turn OFF when any of the crash sensors 2 detects impact.

The interlock relay 3 is controlled by both the crash sensor 2 and the interlock switch 1. The interlock relay 3 is turned OFF from ON, when the interrupting signal for interrupting the output circuit 11 is inputted from any of the crash sensor 2 and the interlock switch 1. This interlock relay 3 controls the contactors 4, and interrupts the output circuit 11 of a battery 5 in the OFF state. In the interlock relay 3 of FIG. 3, one end of the exciting coil 3a is connected to the power supply circuit 10 via the crash sensor 2, and another end of the exciting coil 3a is connected to the FET of the delay circuit 7. In a normal use state, in other words, in a state in which an automotive vehicle runs, the interlock relay 3 is kept in the ON state. The reason is that a current is applied to the exciting coil 3a from the power supply circuit 10, when both the crash sensor 2 and the interlock switch 1 are in the ON state and the FET of the delay circuit 7 is also in the ON state. In a state in which any of the crash sensor 2 and the interlock switch 1 outputs the interrupting signal, or when any of them is turned OFF from ON, a current for the exciting coil is interrupted, and the interlock relay 3 is turned OFF from ON.

The delay circuit 7 includes the FET, whose source and drain are connected in series between the exciting coil 3a of the interlock relay 3 and a ground. The delay capacitor 9 is connected between the gate of the FET and a ground. The delay capacitor 9 delays a drop in the gate voltage. This delay circuit 7 delays a drop in the gate voltage by the delay capacitor 9, when the interlock switch 1 is turned OFF from ON and the output of the interlock switch 1 turns "Low" from "High". For this reason, even if the "Low" signal, which is the interrupting signal, is inputted from the interlock switch 1, the FET is not immediately turned OFF from ON, but is turned OFF after the gate voltage drops lower than a shut-off voltage of the FET. Increasing the capacitance of the delay capacitor 9 can adjust the delay time of the delay circuit 7 to be longer. The delay capacitor 9 is set at a capacitance so that the delay time is about 100 msec–3 sec.

The power device of FIG. 3 has a positive side contactor 4A and a negative side contactor 4B, which interrupt the positive and the negative outputs of the output circuit 11. The positive side contactor 4A and the negative side contactor 4B are simultaneously controlled and turned ON and OFF, then interrupt the positive and the negative outputs of the output circuit 11. The positive side contactor 4A has a contact connected between the positive side of the battery 5 and the positive side output 12. The negative side contactor 4B has a contact connected between the negative side of the battery 5 and the negative side output 13.

One end of each of the exciting coils 4a of the positive side contactor 4A and negative side contactor 4B is connected to the contact of the interlock relay 3, so that the positive side contactor 4A and negative side contactor 4B are simultaneously controlled and are turned ON and OFF. Each other end of the exciting coil 4a of each of contactors 4 is connected to each of the switching elements 6, which are controlled and turned ON and OFF by the crash sensor 2. Each switching element 6 is connected between each exciting coil 4a and a ground. The switching element 6 is an FET; however, a transistor also can be used.

The gate of each of the FET's which are the switching elements 6, is connected to the crash sensor 2. When a transistor is used as the switching element 6, the base of the transistor is connected to the crash sensor via a bias resistor. The switching element 6 is turned OFF from ON, when the interrupting signal is inputted from the crash sensor 2. The switching element 6 does not have a mechanical movable part such as a relay, which moves its contact in order to turn ON and OFF, and can electrically turn ON and OFF. Therefore, the switching element 6 is quickly turned OFF from ON as compared with a relay. Although the time that the switching element 6 is turned ON and OFF depends on a type of the switching element 6, generally, it is time on the order of less than a microsecond. Accordingly, the time is very short, and is almost a negligible amount of time as compared with the turning time of a relay.

In the power device of FIG. 3, when the crash sensor 2 outputs the interrupting signal and the output is turned OFF from ON, both the interlock relay 3 and the switching element 6 are turned OFF from ON. Additionally, the time that the switching element 6 is turned OFF is very short as compared with the interlock relay 3. Accordingly, each contactor 4 is turned OFF from ON, not by turning the interlock relay 3 OFF, but by each turned-OFF switching element 3. For this reason, the contactor 4 is quickly turned OFF from ON by the switching element 6, without taking the time that the interlock relay 3 becomes turned-OFF.

The switching element 6 is controlled only by the crash sensor 2, and is not controlled by the interlock switch 1. For this reason, even if the interlock switch 1 outputs the interrupting signal and is turned OFF from ON, the switching element 6 is not turned OFF from ON. Therefore, even if the interlock switch 1 outputs the interrupting signal, the switching element 6 does not turns a contactor 4 OFF from ON.

Figure 4:
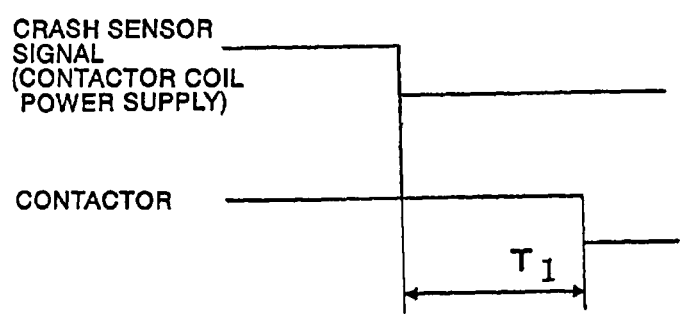
FIG. 4 is a timing chart showing that a crash sensor of the power device shown in FIG. 3 switches the contactor.

FIG. 4 is a timing chart showing that the crash sensor 2 switches a contactor 4. As shown in FIG. 4, when the crash sensor 2 outputs the interrupting signal and is turned OFF from ON, the interlock relay 3 and the contactor 4 are turned OFF from ON with a timing as follows. In the timing chart, the operation time of the switching element 4 is a negligible short time as compared with the operation time of a relay, and is not shown.

The contactor 4 is immediately turned OFF from ON after the operating time (T1) of the contactor 4 by the switching element 6, which is turned OFF from ON by the interrupting signal of the crash sensor 2, without taking the time that the interlock relay 3 becomes turned-OFF.

Figure 5:
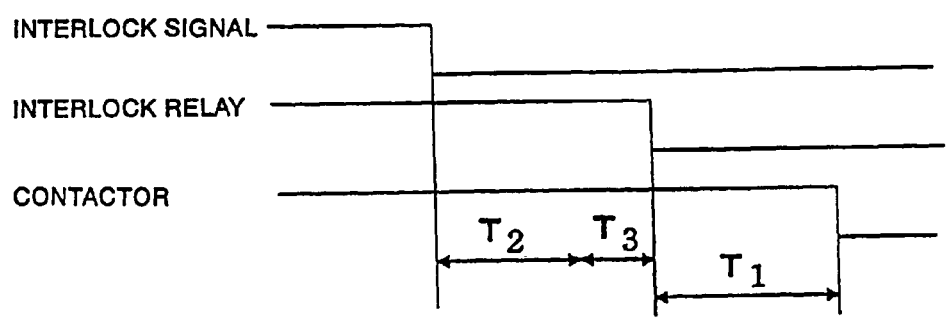
FIG. 5 is a timing chart showing that an interlock switch of the power device shown in FIG. 3 switches the contactor.

FIG. 5 is a timing chart showing that the interlock switch 1 switches the contactor 4. As shown in FIG. 5, when the interlock switch 1 outputs the interrupting signal and is turned OFF from ON, the interlock relay 3 and the contactor 4 are turned OFF from ON in timing as follows. In the timing chart, the operation time of the switching element 4 is a negligible short time, and is not shown.

1. Interlock Relay

After the delay time of the delay circuit 7 and the operating time (T3) of the interlock relay 3, the interlock relay is turned OFF from ON. The reason is that the interrupting signal of the interlock switch 1 is delayed by the delay circuit 7 and then the interlock relay 3 is turned OFF from ON. For this reason, the interlock relay 3 is turned OFF from ON after the time that is the sum of the delay time (T2) of a delay circuit 7 and the operating time (T3) of the interlock relay 3.

2. Contactor

After the interlock switch 1 is turned OFF from ON, the interlock relay 3 is turned OFF from ON, that is, after the time that is the sum of the operating time (T1) of a contactor 4, the delay time (T2) of a delay circuit 7, and the operating time (T3) of the interlock relay 3, the contactor is turned OFF from ON.

As mentioned above, in the power device of FIG. 3, when the crash sensor 2 outputs the interrupting signal, the contactor 4 is turned OFF from ON only after the operating time of a contactor 4 irrespective of the delay time of the delay circuit 7 and the operating time of the interlock relay 3. Therefore, the contactor 4 can be turned OFF from ON very quickly. On the other hand, when the interlock switch 1 outputs the output signal, the contactor 4 is turned OFF from ON, after the delay time of the delay circuit 7, the operating time of the interlock relay 3, and the operating time of the contactor 4. Therefore, the contactor 4 can be turned OFF from ON after the delayed time determined by the delay circuit 7. The delay time of the delay circuit 7 is set so that a malfunction caused by the chattering of the interlock switch 1 etc. does not occur. Accordingly, even if a malfunction in the interlock switch 1 occurs in an instant, the contactor 4 does not interrupt the output circuit 11.

Furthermore, although not shown in the drawings, the power device of the present invention can also control the contactor by a signal from an ECU, which controls ON/OFF of the power device. In this power device, when detecting abnormal conditions of the battery, the ECU outputs an abnormal signal and turns the contactor OFF to interrupt the output circuit. The abnormal signal from the ECU can be inputted into the switching element connected to the contactor, and can turn the contactor OFF. However, another circuit, which turns the contactor OFF in accordance with the abnormal signal from the ECU, can be provided to control the contactor.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power device for an automotive vehicle comprising:
   an interlock switch;
   a crash sensor for detecting impact of an automotive vehicle;
   an interlock relay controlled and turned ON and OFF by the interlock switch;
   an output circuit of a power source;
   a contactor for interrupting the output circuit when the interlock relay is turned OFF; and
   a switching element connected to an exciting coil of the contactor in series and turned ON and OFF by an interrupting signal output from the crash sensor for interrupting the output circuit;
   wherein, when the interrupting signal is outputted from the crash sensor, or when the interlock switch is turned OFF from ON, the contactor is turned OFF to interrupt the output circuit, and
   when the crash sensor outputs the interrupting signal, the switching element is turned OFF, and the contactor is turned OFF by interrupting a current of the exciting coil in the contactor.

2. The power device for an automotive vehicle according to claim 1, wherein, the switching element connected to the exciting coil of the contactor in series is a transistor.

3. The power device for an automotive vehicle according to claim 1, wherein, an exciting coil of the interlock relay, which is connected to the interlock switch via a delay circuit, is operable to turn the interlock relay OFF from ON after a predetermined time determined by the delay circuit when the interlock switch is turned OFF.

4. The power device for an automotive vehicle according to claim 3, wherein, the delay circuit includes a transistor, whose gate is connected to the interlock switch, connected to the exciting coil of the interlock relay, and a delay capacitor connected therein, wherein, when the interlock switch is turned OFF and the gate voltage of the transistor starts to drop, the delay capacitor delays the drop in the gate voltage so as to delay turning the transistor OFF from ON.

5. The power device for an automotive vehicle according to claim 3, wherein, the delay time of the delay circuit is 100 msec–3 sec.

6. The power device for an automotive vehicle according to claim 3, wherein, one end of the exciting coil of the interlock relay is connected to a power supply circuit via the crash sensor, and another end is connected to the switching element of the delay circuit, wherein, when any of the crash sensor and the interlock switch outputs the interrupting signal, the interlock relay is turned OFF from ON.

7. The power device for an automotive vehicle according to claim 1, wherein, the interlock switch includes a plurality of normally on switches connected in series.

8. The power device for an automotive vehicle according to claim 1, wherein, a positive side contactor for interrupting a positive output of the output circuit and a negative side contactor for interrupting a negative output of the output circuit are provided, and each of exciting coils of the positive side contactor and the negative side contactor is connected to the contact of the interlock relay.

9. The power device for an automotive vehicle according to claim 8, wherein, a positive side contactor for interrupting a positive output of the output circuit and a negative side contactor for interrupting a negative output of the output circuit are provided, each of exciting coils of the positive side contactor and the negative side contactor is connected to the switching element controlled and turned ON and OFF by the crash sensor, wherein, when the crash sensor outputs the interrupting signal, both of the switching elements are turned OFF and the positive side contactor and the negative side contactor are turned OFF from ON.

10. The power device for an automotive vehicle according to claim 1, wherein, the crash sensor includes a switch, which is turned OFF from ON when detecting impact.

11. The power device for an automotive vehicle according to claim 10, wherein, the crash sensor is connected to the switching element connected to the exciting coil of the contactor, and an exciting coil of the interlock relay is connected to a power supply circuit via the crash sensor, wherein, when the crash sensor is turned OFF from ON, both the switching element and the interlock relay are turned OFF.

12. The power device for an automotive vehicle according to claim 10, wherein, the exciting coil of the interlock relay is connected to the power supply circuit via the crash sensor, and the exciting coil of the contactor is connected to the interlock relay and the power supply circuit via the crash sensor.

13. The power device for an automotive vehicle according to claim 1, wherein, a plurality of crash sensors are provided, and when any of the crash sensors detects impact, the interlock relay and the contactor are turned OFF.

* * * * *